United States Patent [19]

Gelbart

[11] Patent Number: 4,743,091
[45] Date of Patent: May 10, 1988

[54] TWO DIMENSIONAL LASER DIODE ARRAY

[76] Inventor: Daniel Gelbart, 4616 Garden Grove Drive, Burnaby, B.C., Canada, V5G-3V3

[21] Appl. No.: 924,975
[22] Filed: Oct. 30, 1986
[51] Int. Cl.$^4$ ............................................... G02B 7/02
[52] U.S. Cl. ........................... 350/252; 350/6.6; 350/96.27
[58] Field of Search ............... 350/252, 169, 174, 247, 350/255, 6.5–6.8, 96.25–96.27; 340/782; 362/800

[56] References Cited

U.S. PATENT DOCUMENTS

| | | | |
|---|---|---|---|
| 4,283,116 | 8/1981 | Weis | 350/174 |
| 4,344,671 | 8/1982 | Lang | 350/174 |
| 4,383,755 | 5/1983 | Fedder et al. | 350/6.8 |
| 4,509,826 | 4/1985 | Araghi | 350/96.27 |
| 4,547,038 | 10/1985 | Mori | 350/6.6 |
| 4,681,394 | 7/1987 | Noguchi | 350/6.6 |

FOREIGN PATENT DOCUMENTS 0159023  10/1985  European Pat. Off. ............. 350/6.6

*Primary Examiner*—John K. Corbin
*Assistant Examiner*—Loha Ben

[57] ABSTRACT

A two dimensional laser diode array is disclosed for use in optical data storage consisting of rows and columns of individual lasers diodes, each one having a separate collimating lens. The array is imaged down onto an optical recording medium which is moving relative to the image of the array in order to generate scanning. The diodes in the array are staggered in the direction perpendicular to the scanning direction to achieve an apparent spacing lower than the actual spacing.

4 Claims, 1 Drawing Sheet

TWO DIMENSIONAL LASER DIODE ARRAY

BACKGROUND OF THE INVENTION

In order to record high data rates in optical data storage, multi-channel recording can be used. The existing multi-channel (also known as multi-spot) systems use a laser diode array in which many laser diodes are assembled on a common substrate and their output collected by a single collimating lens. Due to the limited field coverage of high numerical apperature lenses, these arrays can only cover a small width which limits the number of laser diodes which can be used or requires spacings too small to be practical. The current invention overcomes this limitation by combining a large number of discrete laser diodes, each one with its own collimating lens.

SUMMARY OF THE INVENTION

In accordance with the present invention, an optical system is provided which utilizes a two dimensional array of discrete laser diodes to record information on the surface of a light sensitive recording medium. Each laser diode has its own collimating lens thus the overall dimension of the array is not limited to the field of view of any lens. This array is imaged onto the recording medium through the scanning lens. Since the distance between the individual laser diodes is large, the apparent distance between the array and scan lens has to be large. For mechanical packaging reasons this distance can be significantly reduced by using a reverse telescope between the array and the scan lens. The distance will be divided by a number equal to the power of the telescope.

To further reduce the distance from the array to the scan lens, the laser diodes have to appear closer than their mechanical separation. To achieve that the diodes are arranged in a staggered two dimensional array where each row is staggered by $d/n$ in the row direction, where $d$=the distance between columns, $n$=number of rows. This enables the array to be placed $n$ times closer to the scan lens.

DETAILED DESCRIPTION OF THE PREFERRED EMBODIMENT

Figure 1:
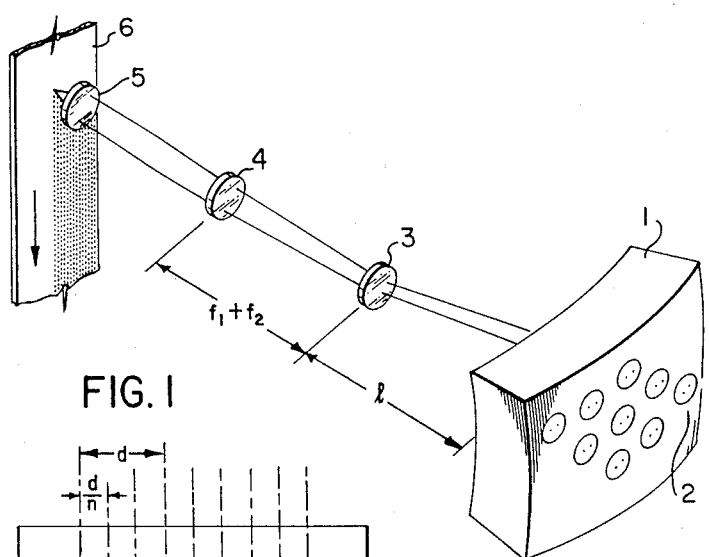
FIG. 1 shows the method of imaging the array onto the recording medium
Figure 2:
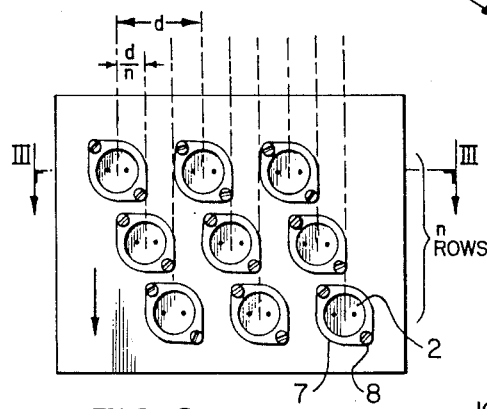
FIG. 2 illustrates the two dimensional staggered arrangement of laser diodes in the array

In FIG. 1 an array 1 consisting of plurality of laser diodes 2 arranged in a two dimensional array of n rows by m columns (illustratively 3×3). In order to image this array down at the correct size onto recording medium 6, three positive lenses 3,4 and 5 are used with focal lengths of $f_1$, $f_2$ and $f_3$ respectively. The array itself is shown in FIG. 2. The m columns have a horizontal spacing of d and the n rows have approximately the same spacing. In order to write continuously the recording medium 6 has to move relative to scan lens 5. This direction of movement will be referred to as the scan direction. The apparatus spacing between the laser diodes 2 in FIG. 2 is $d/n$ in the scan direction. By way of example, referring to FIG. 2, the first row of diodes appears at a distance d from each other when viewed from the scan direction. The second row is offset by an amount of $d/3$ when viewed from the scan direction and the third row is offset $2d/3$ when viewed from the scan direction. Thus the diodes appear at a spacing of $d/3$ when viewed from the scan direction.

Referring back to FIG. 1, all laser diodes 2 are pointing approximately to the centre of lens 3. Since the diodes appear at a separation of $d/n$ when viewed from the scan direction, their angular separation is $d/nl$. This separation is further reduced by lenses 3,4 forming a reverse telescope with a magnification of $f_1/f_2$ when spaced $f_1+f_2$ appart. Thus the angular separation between laser diodes appears $f_1/f_2$ times $d/nl = f_1d/nf_2l$ when viewed through lenses 3,4. The distance between lens 4 and 5 is not critical since the light beams can be adjusted to be collimated when going from lens 4 to lens 5. The angular separation $f_1d/nf_2l$ is converted to a spatial separation of $f_1f_3d/nf_2l$ by the scan lens 5, having a focal length $f_3$.

By way of example, for a 3×3 array shown in FIGS. 1 and 2 having $d=10$ mm, $l=300$ mm, $f_1=5$ mm, $f_2=200$ mm, $f_3=4$ mm the spacing between the recorded tracks will be $f_1f_3d/nf_2l=5.4.10/3.200.300$ mm$=1.1$ microns.

Figure 3:
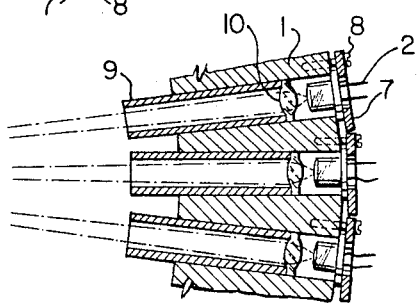
FIG. 3 is a cross section of the array showing the laser diodes and their collimating lenses.

Referring now to FIG. 3, the method of collecting the light from each laser diode is shown. Laser diode 2 is mounted to the array 1 using a clamp 7 and two screws 8. The array can be moved sideways by a small amount to compensate for manufacturing tolerances. The light from each laser diode 2 is collected by a collimating lens 10 mounted in a sleeve 9. Sleeve 9 can be moved in and out of array 1 to achieve the desired divergence of the output beam. Parts 1,9,7 and 8 are made of a stable metal, by way of example, brass.

In operation, each one of the sleeves 9 is adjusted until the beam between lens 4 and lens 5 is substantially collimated. The exact lateral position of each laser diode 2 is adjusted until all light beams substantially pass through the entrance pupil of the scan lens 5.

It is clear to anybody versed in the art that in order to utilize the current invention, means of generating scanning motion between the scan lens and medium are required. These means are of conventional nature, as currently used in optical discs and optical tape recorders.

What is claimed is:

1. An optical system for recording information on the surface of a light sensitive medium comprising:
    a two-dimensional array of laser diodes mounted on a curved substrate and arranged in such a way to converge laser beams of said laser diodes onto an intermediate lens, each laser diode having a separate collimating lens in optical alignment therewith, said collimating lens collecting most of the emitted light from said laser diode;
    a lens for imaging said array of laser diodes onto said light sensitive surface;
    one or more intermediate lenses placed between said imaging lens and said array of laser diodes in order to reduce the image size, and a means for adjusting the position of each laser diode relative to said collimating lens to deliver a substantial amount of the emitted light from each laser diode to the surface of said medium.

2. An optical system as in claim 1 wherein said array of laser diodes comprises a plurality of rows and columns of said laser diodes, each one of said rows being offset relative to the previous row in the direction of the rows by an amount less than the spacing of the columns.

3. An optical system as in claim 2 wherein number of rows and columns is larger than 2 and smaller than 10.

4. An optical system as in claim 1 using reflective optics instead of at least one of said imaging and intermediate lenses.

* * * * *